Nov. 30, 1971     D. L. BRUNTON ET AL     3,623,265

METHOD OF FIXING NITROGEN IN THE ATMOSPHERE AND THE SOIL

Filed Nov. 26, 1969     2 Sheets-Sheet 1

INVENTORS
DON L. BRUNTON and
C.W. OSBORNE

BY

ATTORNEYS

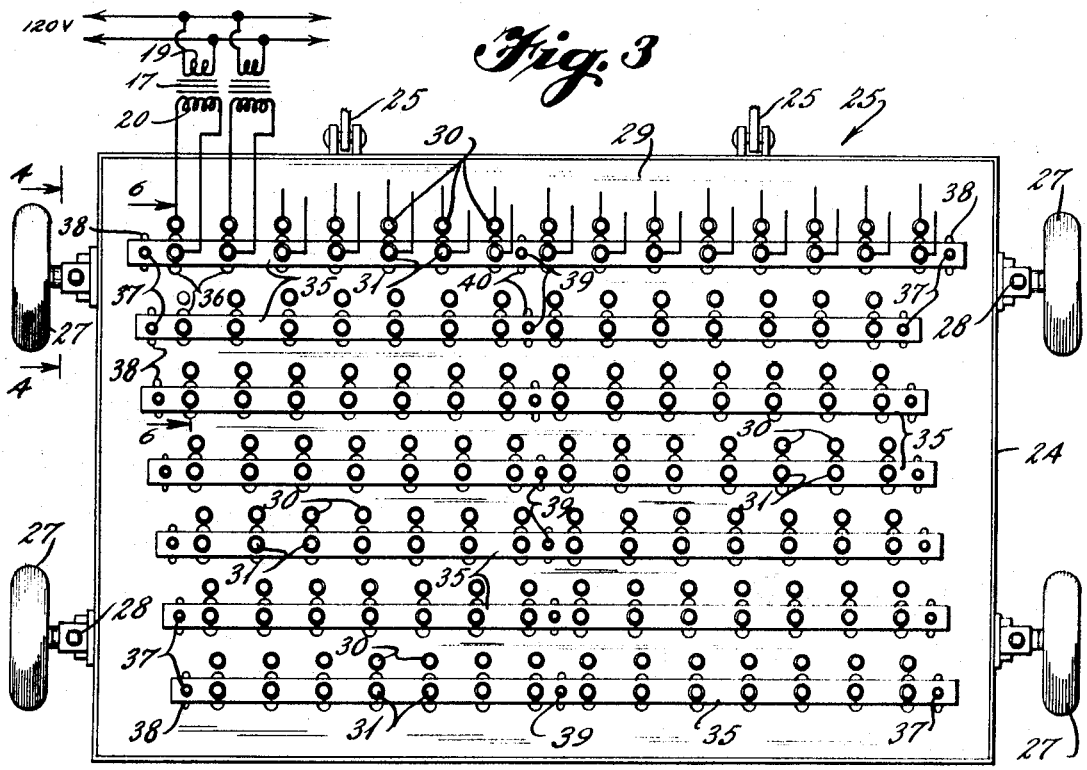
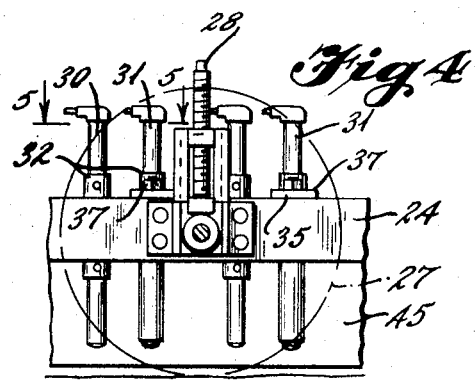
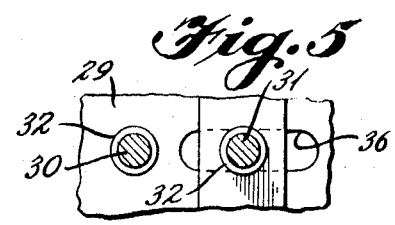
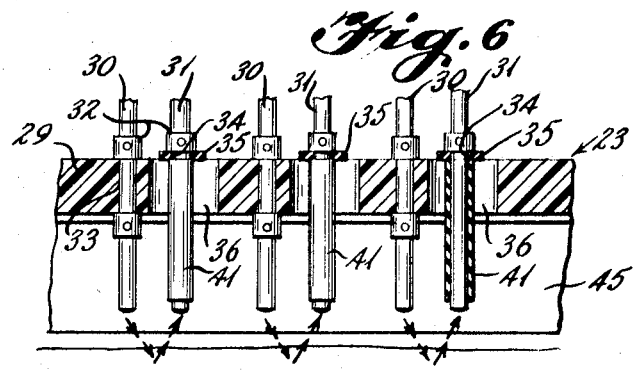
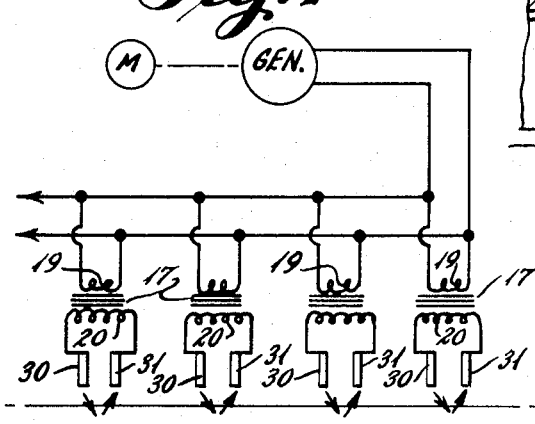
INVENTORS
DON L. BRUNTON and
C. W. OSBORNE
BY
ATTORNEYS

United States Patent Office 3,623,265
Patented Nov. 30, 1971

3,623,265
METHOD OF FIXING NITROGEN IN THE ATMOSPHERE AND THE SOIL
Don L. Brunton, Amarillo, and Charles W. Osborne, Pampa, Tex., assignors to Nitron, Inc., Pampa, Tex.
Filed Nov. 26, 1969, Ser. No. 880,068
Int. Cl. A01g 7/04; A01c 1/00; C01b 21/30
U.S. Cl. 47—1.3
2 Claims

ABSTRACT OF THE DISCLOSURE

Method and apparatus for producing heat in the form of an arc of electrical energy in the presence of atmosphere to reproduce the process of fixation of nitrogen in the atmosphere and in the ground and convert atmospheric nitrogen to nitrate in a form usable by plants to encourage growth.

BACKGROUND OF THE INVENTION (1) Field of the invention

This invention relates generally to agriculture and the application of fertilizer and the like to assist in plant growth and relates particularly to the method and apparatus of fixing atmospheric nitrogen and returning the nitrogen from the air to the soil in a form that can be utilized by plants to promote growth as well as to free locked-in chemical elements within the soil and make them available to the plants.

(2) Description of the prior art

In the past plant fertilizers containing nitrate, phosphate and potassium salts plus certain trace elements have been added to the soil in a well known manner to promote plant growth. The normal atmosphere is approximately four-fifths nitrogen, and plant life, through the process of photosynthesis, utilizes some of the nitrogen from the atmosphere as food, particularly after the plants have developed a substantial leaf structure. Since the beginning of time atmospheric nitrogen has been fixed and returned to the soil by nature in several ways, including by electrical discharges or lightning during thunder storms. The heat of the electrical discharges combines molecules of nitrogen and oxygen from the air to form nitric oxide which, upon cooling, combines with additional free oxygen to form nitrogen dioxide $NO_2$. The nitrogen dioxide polymerizes to form $N_2O_4$ which in turn combines with water to form nitrate which plants use as fertilizer.

Some efforts have been made to reproduce the fixation of atmospheric nitrogen such as the Birkelund-Eyde process which was practiced in Norway and is described in the textbook "General Chemistry," published by McGraw-Hill, 1946, Chapter XXX, Section 31.3, page 406. In the Birkelund-Eyde process an electirc arc was spread into a large disk by means of a powerful magnetic field and air was blown through the flame at temperatures in excess of 3,000 degrees C. Under these conditions approximately 4% of the atmospheric nitrogen was converted to nitric oxide. After passing through the arc the gases were cooled to approximately 1,000 degrees whereupon the nitric oxide reacted with more atmospheric oxygen to form nitrogen dioxide which was subsequently hydrated to form dilute nitric acid. In this process the apparatus was in fixed position and the resulting nitric acid was primarily used in the manufacture of explosives by converting the acid into its salts, the nitrates, or by using the acid in the nitration of certain organic compounds.

Other devices have been provided for treating soil and plants with electrical discharges, such as Kreuger 2,036,416; Keller 2,429,412; Baker 2,484,443; Opp 2,591,597, etc.; however, these prior art devices are primarily for sterilizing the earth and killing weeds, worms, bacteria and the like by the application of heat caused by the electrical discharges. The Opp patent 2,596,504 discloses apparatus for treating soil by killing the weeds as well as by soil electrolysis by introducing different minerals or compounds into the soil. These prior art devices have not been entirely successful due mainly to the excessive power requirements, as well as the fact that most of the electric arcs have been produced by a relatively few electrodes and failed to suggest a portable nitrogen generator device which will combine nitrogen and oxygen from the atmosphere and in the ground for the production of nitrogen nitrate in a form which can be utilized by plants to stimulate growth.

SUMMARY OF THE INVENTION

The present invention is a process and apparatus which utilizes electrical energy to combine nitrogen and oxygen from the atmosphere to form nitric oxides which are attracted to the soil and converted to nitrogen nitrate in a form which plants can use as a fertilizer to stimulate growth. The apparatus and method include a base having a plurality of electrodes mounted in pairs thereon with each pair of electrodes being electrically connected to a transformer which causes an electric arc to pass from one of the electrodes to the ground and from the ground to the other electrode of each pair to cause the fixation of atmospheric ntirogen by combining the nitrogen of the air with oxygen in the air and in the ground to form oxides of nitrogen which will combine with moisture in the soil to form nitrogen nitrate in a form that can be utilized by plants to stimulate the growth thereof.

It is an object of the invention to provide a portable nitrogen generator which utilizes electrical energy to combine nitrogen and oxygen from the air under controlled conditions to form nitric oxide which will combine with water to form nitrogen nitrate in a form which can be utilized by plants as a food.

Another object of the invention is to provide a method of converting atmospheric nitrogen to nitrogen nitrate in the soil in a form which can be readily used by plants.

BRIEF DESCRIPTION OF THE DRAWINGS

FIG. 3 is a top plan view of the structure cf FIG. 2.

FIG. 4 is an enlarged fragmentary section on the line 4—4 of FIG. 3.

FIG. 5 is an enlarged fragmentary section on the line 5—5 of FIG. 4.

FIG. 6 is an enlarged fragmentary section on the line 6—6 of FIG. 3.

FIG. 7 is a schematic wiring diagram.

DESCRIPTION OF THE PREFERRED EMBODIMENTS

Figure 1:
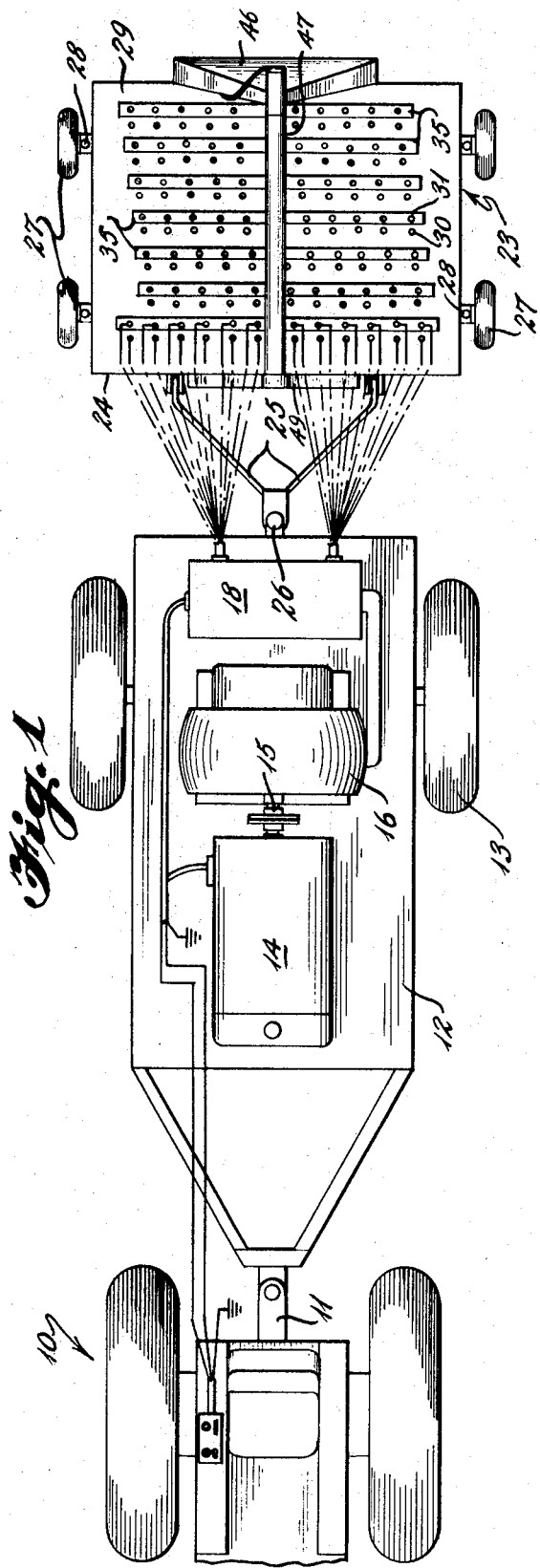
FIG. 1 is a top plan view illustrating one application of the invention.
Figure 2:
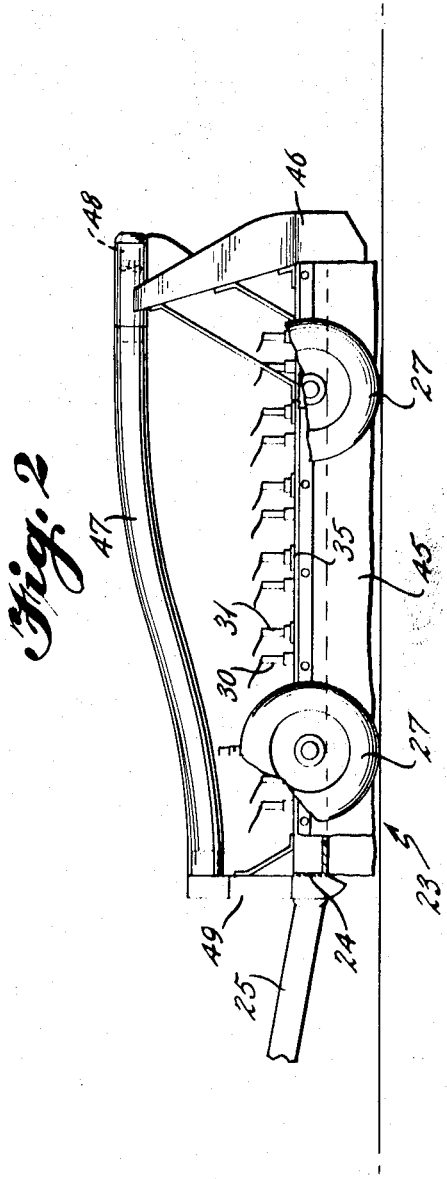
FIG. 2 is an enlarged side elevation of the electrode carrying trailer.

With continued reference to the drawings, a tractor 10 is connected by a hitch 11 to a trailer 12 supported by ground-engaging wheels 13. The trailer 12 carries an internal combustion engine 14 connected by a drive shaft 15 to an 80 kw. generator 16 which supplies 110–120 volt electric current to a plurality of single phase transformers 17, preferably of the illuminous type, mounted in a housing 18. Each of the transformers has a primary coil 19 operating at 110–120 volts and a secondary coil 20 operating at 15,000 volts and 30 milliamps.

A second trailer 23 includes a frame 24 connected to the trailer 12 in any desired manner, as by a tongue 25 connected to a ball type hitch 26 carried by the trailer 12. The frame 24 is supported by ground-engaging wheels 27 which may be mounted for vertical adjustment in any desired manner, as by threaded standards 28 to permit generally vertical movement of the frame toward and from the earth. As illustrated the wheels are independently adjustable although it is noted that the wheels could be adjustable in any other conventional manner, as by a remotely controlled gear motor or the like. Also, it is contemplated that the wheels 27 could be omitted and the frame 24 supported directly by the trailer 12.

The frame 24 supports a base 29 constructed of electrical insulating material, such as phenolic or the like, in which a plurality of pairs of negative and positive electrodes 30 and 31, respectively, are mounted in any desired manner, as by clamps 32. The electrodes 30 and 31 normally are disposed along a generally vertical axis and extend downwardly to a position adjacent to the earth. Such electrodes usually are arranged one behind the other with the electrode 30 being received in an opening 33 and the electrode 31 being adjustably mounted relative to the electrode 30. As illustrated several rows of laterally and longitudinally spaced pairs of electrodes are provided for more complete uniform distribution over substantially the entire area of the base 29. The pairs of electrodes of one row are staggered or spaced laterally from the electrodes of any other row for a purpose which will be described later.

In order to adjust the electrodes 31 relative to the electrodes 30, the electrodes 31 preferably are received within openings 34 in a mounting strip 35 and the lower ends of such electrodes are received within slots 36 in the base 29. The strip 35 is adjustable longitudinally of the base 29 to move the electrodes 30 and 31 toward and away from each other in any desired manner, as by carriage bolts 37 having a square shank portion received within slots 38 adjacent each end of the mounting strip 35. If desired an intermediate guide pin 39 is mounted substantially centrally of the mounting strip 35 and extends downwardly into a slot 40 in the base 29 to guide the movement of the mounting strip. The electrodes 30 and 31 are movable relative to each other to compensate for existing atmospheric and soil conditions, as will be explained later. It is contemplated that the mounting bar, number 35 could be an electricity conducting bus bar and the leads to the positive electrodes, 31 could be connected to a common line.

Normally the positive electrodes 31 are provided with an insulating sleeve or shield 41 to reduce or eliminate the tendency to arc between adjacent electrodes. The electrodes 30 and 31 of each pair are connected to opposite sides of the secondary coil 20 of one of the transformers 17 and an independent transformer is supplied for each pair of electrodes. The negative electrode 30 is adapted to discharge a high voltage, low amperage current which will cause an arc to bridge the gap between the lower end of such electrode and the earth. The positive electrode 31 attracts the electrons in the earth and causes an arc to bridge the gap between the earth and the lower end of the electrode 31.

A skirt 45 is connected along both sides and the rear of the frame 24 and such skirt extends downwardly to a position closely adjacent to the earth. As the device moves over the earth, air will enter the area below the base 29 and come into contact with the first row of electrodes. Special care should be taken to properly position the electrodes 30 and 31 of the first row in accordance with the existing conditions of the air and the soil. For example, in a situation having a high humidity and a substantial amount of moisture in the earth, the electrodes 30 and 31 should be spaced apart farther than is necessary in a situation having low humidity and low moisture content in the earth so that the arc will bridge the gap between the electrodes and the earth and will not bridge the gap between adjacent electrodes.

When the electrodes of the first row discharge electrical energy and receive electrical energy from the earth, nitrogen in the adjacent air, as well as the nitrogen within the earth, is fixed to produce nitric oxide which will be converted to nitrogen nitrate. The arcing of the electrical current causes the air surrounding the electrodes to be ionized and reduces the attraction between adjacent electrodes of the next row and therefore the spacing of the electrodes of the second row is not as critical as the spacing in the first row.

Continued movement of the air from front to back will cause additional ionization of the air and therefore each succeeding row is less susceptible to arcing than the previous row. After the first two or three rows of electrodes, any succeeding rows of electrodes will operate over wide tolerances with a minimum amount or arcing between adjacent electrodes. Due to the high voltages involved, a corona will appear around the tip of each of the electrodes to further supplement the ionization of the air in the area below the base 29.

In order to relieve the critical setting of the first row of electrodes, a scoop 46 may be located at the rear of the frame 24 and such scoop is connected to a longitudinally extending duct or pipe 47 having a motor driven fan 48 and a downwardly extending discharge scoop 49 may be provided which will remove ionized air from the rear of the base just before it is discharged to the atmosphere and will return the ionized air to the front of the device where the ionized air will be combined with the air entering the area below the base 29 to reduce the criticality of the spacing of the front electrodes.

The fixation of atmospheric nitrogen and the combining of the nitrogen with oxygen to form nitric oxide takes place in the presence of heat of up to approximately 43,000 calories created by the arcing of the electrical discharge. However, the initial step of forming nitric oxide is reversible so that if too much heat is applied nitric oxide, 2NO, will be reduced to basic elements of nitrogen and oxygen. It is for this reason that the electrodes 30 and 31 of each row are staggered relative to the electrodes of any other row along the path of travel so that nitric oxide which has been formed will no be reduced to the basic elements. Also the staggering of the electrodes produces a more uniform production of nitrogen nitrate over the entire area of the base 29.

Tests have shown that approximately 4.48 pounds of nitrogen in usable form is produced for every 450 watt hours consumed and that a minimum of approximately 660 pounds of actual nitrogen, in nitrate form, can be produced in one hour of operation utilizing the output of the 80 kw. generator.

In addition to affixing atmospheric nitrogen, the flow of electrons into and from the earth will cause an electrochemical reaction within the earth to release locked-in chemicals and compounds and make the same available to the plants and provide an additional source of plant food. Also it is contemplated that some of the affixed nitrogen from the atmosphere could oxidize into some of the pentoxides depending upon the elements and compounds available in the earth that would bright about this transition.

In the operation of the device the tractor 10 pulls the trailer 12 and the trailer 23 through the field while the generator 16 is being driven by the internal combustion engine 14. The 80 kw. generator supplies 110–120 volts electric current to the primary coil of a plurality of transformers 17 and each of such transformers has a secondary coil operating at 15,000 volts and 30 milliamps. The opposite sides of the secondary coil are connected to a pair of electrodes 30 and 31 carried by the base 29 and adjustable toward and from each other in accordance with existing conditions of soil and atmosphere. The negative electrode 30 discharges the electrical energy and causes an arc to bridge the space between the electrode and the earth and the positive electrode 31 attracts electrons from the earth and causes an arc from the earth to the electrode 31. The arcing of the electric current creates energy in the form of heat which combines nitrogen $N_2$ with oxygen $O_2$ to form nitric oxide 2NO. Nitric oxide which is formed in the air will be attracted to the earth, while nitric oxide formed in the earth will remain. As the nitric oxide cools, it will absorb free oxygen to form nitrogen dioxide $NO_2$. The nitrogen dioxide polymerizes to form $N_2O_4$ which then combines with water in the soil to form nitrogen nitrate which is used by plants as a food.

We claim:

1. The method of fixing atmsopheric nitrogen for use as a plant food comprising the steps of providing a base mounted for movement above the earth, mounting a plurality of pairs of electrodes on said base in a plurality of laterally extending rows with the axis of each electrode being disposed in a generally vertical plane, arranging said rows in spaced relation one behind another along the direction of movement of said base, fixing a first electrode of each pair to said base in a horizontal direction, adjustably mounting the second electrode of each pair on said base for generally horizontal movement toward and from the cooperating first electrode, vertically adjusting the first and second electrodes of each pair toward and from the earth to locate one end of each electrode adjacent to but spaced from the earth, spacing said first and second electrodes of each pair closer together than the distance to an adjacent pair of electrodes, staggering the pairs of electrodes of each row relative to the electrodes of other rows along the direction of movement of said base so that each pair of electrodes will follow a different path, providing a separate high voltage low amperage transformer having primary and secondary coils for each pair of electrodes, connecting one electrode of each pair to the negative side of the secondary coil of its associated transformer and connecting the other electrode of each pair to the positive side thereof, connecting the primary coil of each of said transformers to a source of electrical energy so that the negative electrode of each pair causes a substantially continuous arc to bridge the gap between the negative electrode and the earth to discharge high voltage electricity directly into the earth and the positive electrode of each pair causes a substantially continuous arc to bridge the gap between the earth and said positive electrode to attract high voltage electricity directly from the earth, whereby a portion of the nitrogen in the atmosphere will be converted to nirate usable as a plant food.

2. The method of claim 1 including the additional step of insulating one electrode of each pair to prevent arcing between the first and second electrodes.

References Cited

UNITED STATES PATENTS

| | | |
|---|---|---|
| 546,682 | 9/1895 | Scheible. |
| 2,007,383 | 7/1935 | Opp. |

TA-HSUNG TUNG, Primary Examiner

N. A. KAPLAN, Assistant Examiner

U.S. Cl. X.R.

204—178